June 3, 1958  R. L. GRIFFIN  2,837,198
COMPUTER DEVICE FOR LEATHER STACKER
Filed Dec. 10, 1956  5 Sheets-Sheet 1

INVENTOR.
ROGER L. GRIFFIN
BY R. G. Stoy
ATTORNEY

INVENTOR.
ROGER L. GRIFFIN
BY R. G. Story
ATTORNEY

June 3, 1958 R. L. GRIFFIN 2,837,198
COMPUTER DEVICE FOR LEATHER STACKER
Filed Dec. 10, 1956 5 Sheets-Sheet 3

INVENTOR.
ROGER L. GRIFFIN
BY R. G. Story
ATTORNEY

June 3, 1958 R. L. GRIFFIN 2,837,198
COMPUTER DEVICE FOR LEATHER STACKER
Filed Dec. 10, 1956 5 Sheets-Sheet 5

INVENTOR.
ROGER L. GRIFFIN
BY R. T. Story
ATTORNEY

United States Patent Office 2,837,198
Patented June 3, 1958

2,837,198

COMPUTER DEVICE FOR LEATHER STACKER

Roger L. Griffin, Manchester, Mass., assignor to Swift & Company, Chicago, Ill., a corporation of Illinois Application December 10, 1956, Serial No. 627,352

15 Claims. (Cl. 198—21)

The present invention relates to an apparatus and a method for determining when a predetermined percentage of the length of articles of varying sizes moving along a conveyor reach a given point on the conveyor. The specific embodiment hereinafter described was devised for use with an apparatus wherein sheets are transferred from a conveyor to a bar hanger with the sheets being looped over the bar with a given percentage of the total length of the sheet being hung on each side of the bar even though the sheets vary in size.

I have previously devised a transporting and stacking apparatus for use in the leather industry wherein each sheet of leather is loaded from a conveyor onto a bar hanger or carrier with the leather being draped over the carrier. The carrier is then mechanically transported to another point whereat the sides of leather are unloaded from the carriers and stacked onto suitable supports such as tables or horses. During the course of transporting of the sides of leather they may or may not be moved through certain treating mechanisms, such as driers. This prior apparatus which I have invented is discussed more fully in my patent application Serial No. 595,706, filed July 3, 1956.

In this previous invention the instant when the carrying member was lifted up to receive the side of leather from the conveyor, in a manner such that the side of leather was draped over the carrier, was determined from the time when the leading edge of the side of leather (or it could be the trailing edge) reached a specific point with respect to the conveyor. This procedure is quite satisfactory as long as the sides of leather (or such other sheets of material as might be handled) are of substantially the same length. However, when there is a very wide variance in the length of the sides of leather it will be found that if the apparatus is adjusted for sides of one length, then sides of a much shorter or longer length are not satisfactorily draped over the carrying member. In some leather operations it is quite common for the sides of leather to vary between two and six feet long. The principal object of the present invention is to control the stacking and transporting apparatus to initiate the movement of the carrying member at a time such that a predetermined percentage of the side of leather will be draped over one side of the carrying member while a predetermined percentage of the leather is draped over the other side of the carrying member. This enables the stacking apparatus to operate with widely varying lengths of sheets. It will be readily apparent that the method and apparatus of my invention may be utilized in other applications where it is desired to ascertain when a given percentage of lengths of articles moving along a conveyor will reach a given point along the conveyor.

A further object and advantage of the apparatus that I have devised is its relative simplicity coupled with a very high degree of accuracy and reliability. There is nothing complicated about the structure. The parts are readily produced and maintained by nominal metal working operations. Its operation is quickly understood once the invention has been shown and described to one desiring to acquaint himself with it.

Other objects and advantages will become apparent from the following description taken in conjunction with the drawings, in which.

The method that I have devised for determining when a particular part of the articles traveling along a conveyor is at a given location with a predetermined percentage of the article rearwardly of that location perhaps can be better explained after discussing the apparatus that will carry out this method. However, briefly this method contemplates choosing a point along the conveyor rearwardly of the predetermined location, determining as a standard the length of time that would be required by an article traveling along said conveyor to pass said given point if the length of the article were equal to the distance between the given point and the predetermined location divided by the percentage of the length of the article that is to be rearwardly of said location. As an article of unknown length travels along the conveyor I then measure the length of time it requires that article to traverse the given point and subtract that time from the standard to obtain a time difference for that article. That time difference is then multiplied by said percentage which will give the time after the trailing edge of the article passes said given point when the desired part of the article is over said location with said percentage of the article rearwardly of said location.

Figure 1:
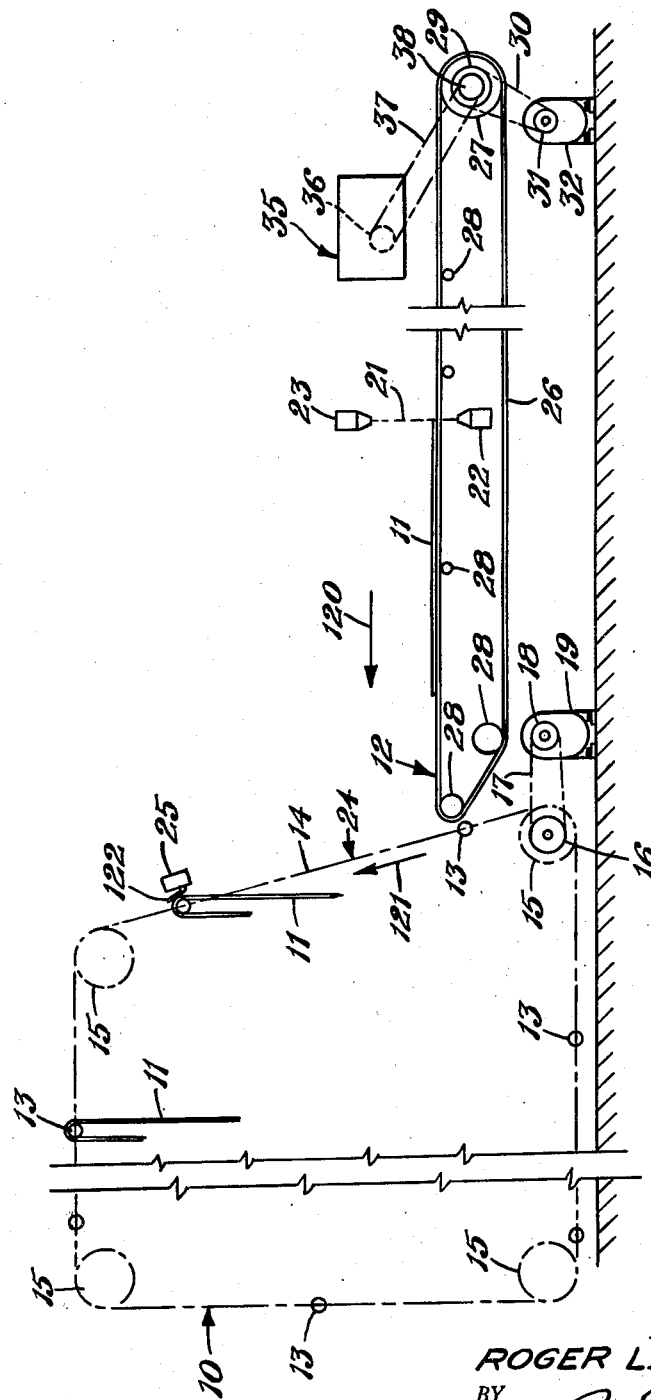
Figure 1 is a schematic elevation of an apparatus incorporating the invention.

Referring to Figure 1, a stacker generally 10 receives sides of leather 11 from a conveyor generally 12. Stacker 10 and conveyor 12, of course, are mounted on suitable frames, not shown in the schematic illustration of Figure 1. The stacker 10 has a plurality of carrying members 13 which are elongated rods over which the sides of leather 11 are hung. Carrying members 13 are suspended between a pair of endless chains 14 which travel about a path determined by the position of a plurality of sprockets 15. Attached to one of the sprockets 15 is a sprocket 16 which is driven by a chain 17 from a sprocket 18 on the output shaft of a suitable power means represented in Figure 1 by gear head motor 19. The structure of the stacker 10 thus far described is illustrated in greater detail in my prior applications, Serial No. 554,188, now abandoned, and 595,706, filed December 20, 1955, and July 3, 1956, respectively. In the invention therein described the power means 19 is rendered effective a predetermined length of time after a side of leather 11 moving along conveyor 12 cuts a light beam 21 from a light source 22 directed at an electric eye means 23. Instead of using electric eye means 23, a switch might be actuated by contact with the side of leather. The period of time is adjusted so that sides of leather 11 of approximately a predetermined length will be looped over one of carrying members 13 positioned immediately adjacent the discharge end of conveyor 12 at the time that that carrying member commences its upward movement along the generally vertical run 24 of the path of movement of carrying members 13 and chains 14. After having moved a predetermined distance a switch 25 is actuated to again disable the power means 19 to stop the movement of the stacker. When the stacker stops, a carrying member 13 again will be immediately adjacent the discharge end of conveyor 12. The present invention might be employed with various types of stacking apparatus.

While the present invention is concerned with a conveyor 12, the particular structure of the conveyor is not important insofar as the present invention is concerned. In the disclosed embodiment it consists of a plurality of ribbons 26 which at one end pass about driving drum 27 and are supported by a plurality of idling pulleys 28. A sprocket 29 is connected by a chain 30 to a sprocket 31 on the output shaft of a power means represented by gear head motor 32.

To carry out the method previously described, a computer generally 35 having a drive sprocket 36 thereon is connected by means of a chain 37 to a sprocket 38 driven in unison with conveyor 12 such as by attaching sprocket 38 to sprocket 29. The computer 35 is actuated by the electric means 23 so as to measure the length of time that it takes for an article such as side of leather 11 to traverse a given point along conveyor 12, which point in Figure 1 is represented by the position of light beam 21. The computer is then connected to power means 19 of stacker 10 so as to determine when is the proper time to start the movement of carrying members 13 so that a given proportion or percentage of the side of leather will be hung on each side of the carrying member as the carrying member moves upward. Thus, in this embodiment it is desired to know just when a given part of the side of leather will be at a predetermined location with respect to conveyor 12, which location in this embodiment is a point immediately adjacent the end of conveyor 12, i. e. the pick-up point of carrying member 13.

Figure 2:
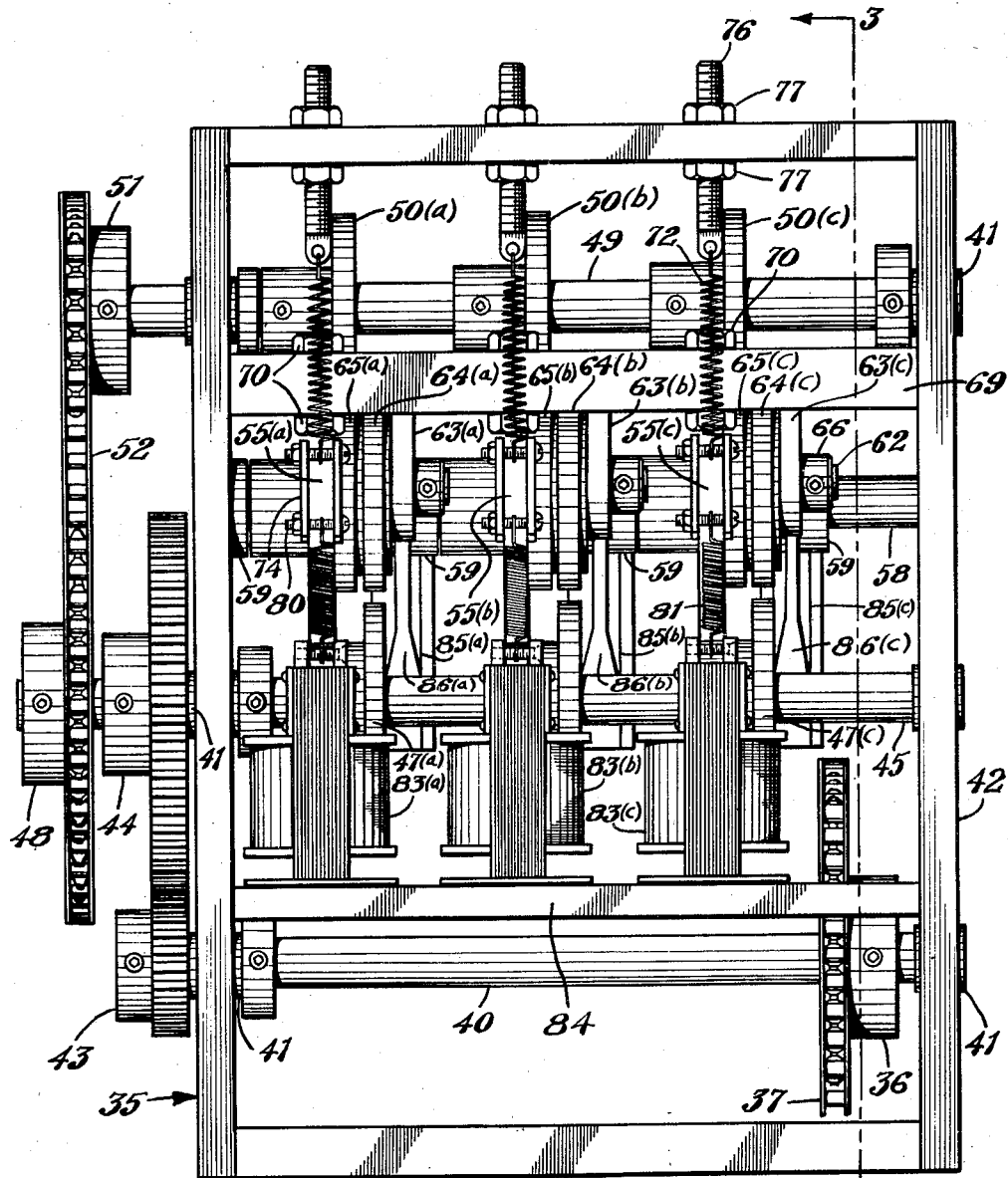
Figure 2 is an end elevation of an embodiment of the computing structure.
Figure 3:
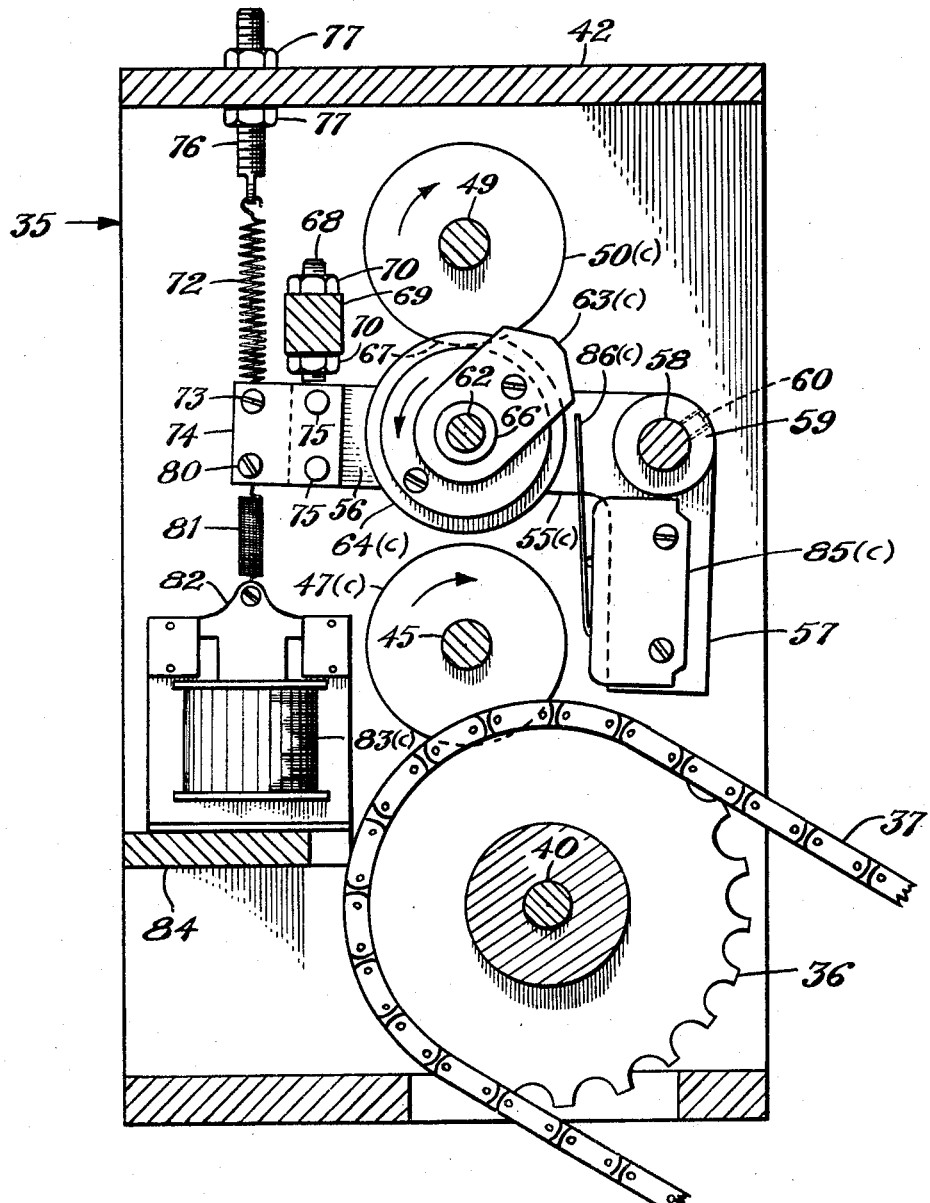
Figure 3 is a section taken at line 3—3 of Figure 2.

The structure of computer 35 is illustrated in Figures 2 and 3. Drive sprocket 36 is attached to a shaft 40 suitably journaled in bearings 41 mounted in the frame 42 of the computer. At the opposite end of shaft 40 is a gear 43 which engages a gear 44 on a second shaft 45. Shaft 45 is likewise journaled in a pair of bearings 41 in frame 42. In addition to having gear 44 attached to shaft 45, there are also three lower drive wheels 47(a), 47(b) and 47(c) and a sprocket 48 attached to the shaft. An upper drive shaft 49 is suitably mounted in a pair of bearings 41 in frame 42. Shaft 49 has three identical upper drive wheels 50(a), 50(b) and 50(c) and a sprocket 51 connected to sprocket 48 by a chain 52.

Three rockers, 55(a), 55(b) and 55(c), each having a pair of arms 56 and 57 are pivotally mounted on a fixed shaft 58 attached to frame 42. A plurality of collars 59 attached to shaft 58 by set screws 60 hold rockers 55 in place on the shaft, yet permitting the rockers to freely rotate about the shaft. On arm 56 of each of rockers 55 is a stub shaft 62. Stub shaft 62 on rocker 55(a) carries a cam 63(a) attached to two drive rolls 64(a) and 65(a), which are attached together and held on shaft 62 by a collar 66 whereupon they rotate freely as a unit on shaft 62. Identical cams 63(b) and 63(c) are on rockers 55(b) and 55(c), respectively, together with corresponding pairs of drive rolls 64 and 65. As seen in Figure 2, rolls 65 are aligned with upper drive wheels 50, while rolls 64 are aligned with lower drive wheels 47.

Rolls 65 have a portion of the periphery cut out to form a concave depression 67 (Figure 3) to fit about the periphery of upper drive wheels 50. A stop screw 68 passing through cross bar 69 of frame 42 is held in place by a pair of nuts 70 and contacts arm 56 of rocker 55 to hold the cut out portion 67 of drive roll 65 just out of contact with the periphery of drive wheel 50. A spring 72 normally holds rockers 55 in a position such that arm 56 is in contact with stop screw 68. As will be seen, at its lower end spring 72 hooks onto a bolt 73, which bolt passes between a pair of plates 74 held on the end of arm 56 by means of rivets 75. The upper end of spring 72 is attached to an adjusting screw 76 passing through frame 42 and held in place by a pair of jam nuts 77. A second bolt 80 passing between plates 74 holds a spring 81. The lower end of spring 81 is connected to the armature 82 of a solenoid 83. As is readily apparent in Figures 2 and 3, all of these parts are in triplicate, with solenoids 83(a), 83(b) and 83(c) being connected to rockers 55(a), 55(b) and 55(c), respectively. Solenoids 83 are mounted on platform 84 forming a part of frame 42.

On arms 57 of rockers 55 are three snap-action switches, 85(a), 85(b) and 85(c), such switches being of the type commonly sold under the trademark "Microswitch." Each of these switches 85 has an actuating arm 86. Spacers (not shown) are employed to mount switches 85 a sufficient distance away from arms 57 so that the actuating arms 86 of the switches 85 are aligned with cams 63.

Figure 4:
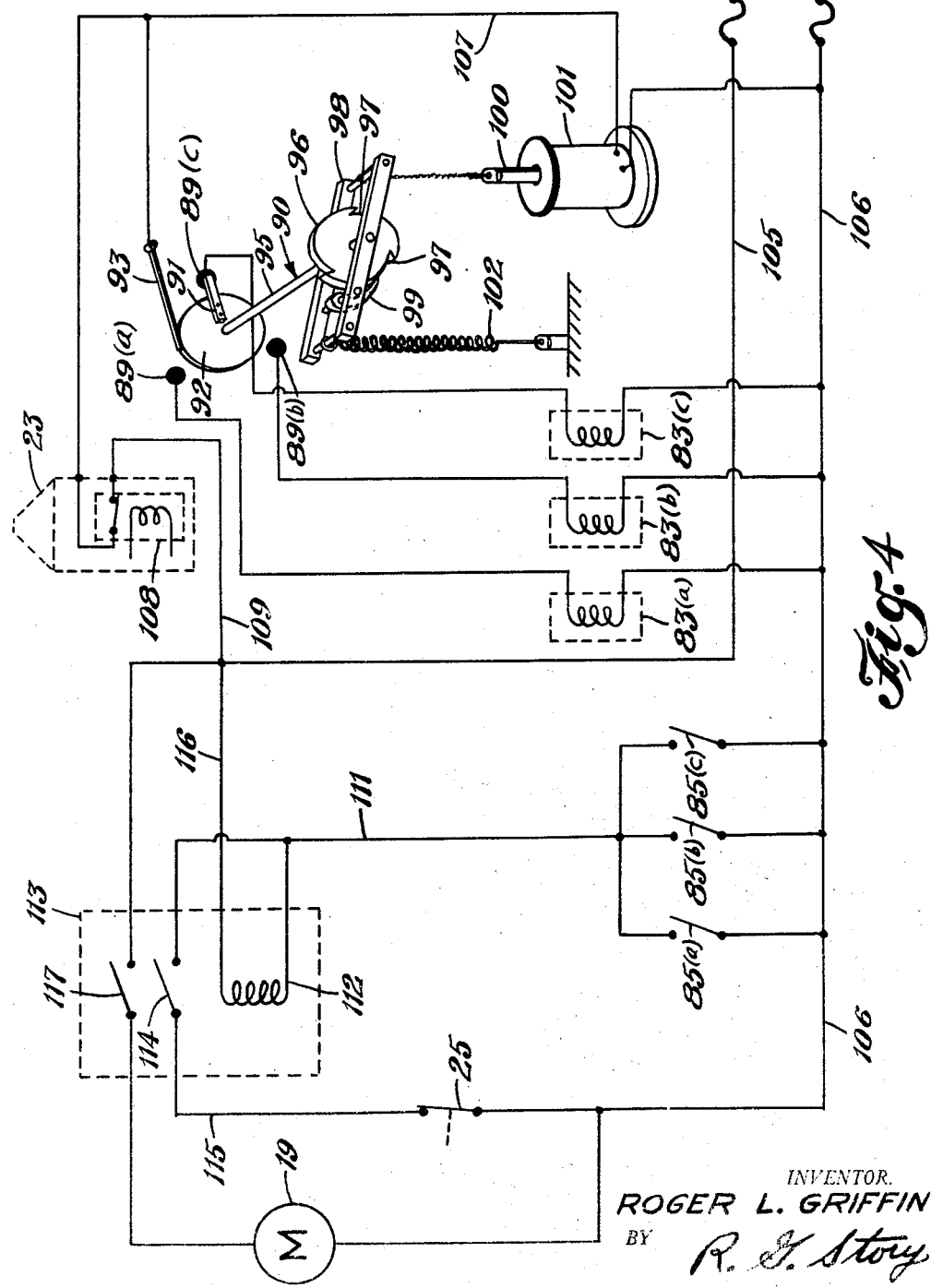
Figure 4 is a schematic representation of the electrical controls for the described embodiment.

Referring to Figure 4, it will be seen that solenoids 83(a), 83(b) and 83(c) are connected to contacts 89(a), 89(b) and 89(c), respectively, of a sequence switch generally 90. An arm 91 is attached to a wheel 92 with an electrical circuit existing through arm 91 through wheel 92 to a wiper 93. A shaft 95 connects wheel 92 with a ratchet wheel 96 having a plurality of ratchet pockets 97 thereon. A support 98 is pivotally mounted on shaft 95 and carries the ratchet pawl 99. One end of support 98 is connected to armature 100 of solenoid 101, while the other end of the support is connected to a spring 102. It will be apparent in Figure 4 that the solenoid 101, when energized, rotates support 98 in a clockwise direction so as to engage pawl 99 in one of pockets 97. When the solenoid 101 is de-energized, spring 102 rotates support 98 in the opposite direction, whereupon the ratchet rotates wheel 92 to move arm 91 from one of contacts 89 to the succeeding contact 89.

Wires 105 and 106 are connected to a suitable source of electric power. One side of each of solenoids 83 is connected to wire 106 as is one side of solenoid 101. The opposite side of solenoid 101 is connected by means of a wire 107 to the normally closed contacts of a relay 108 forming a part of the electric eye means 23. These contacts are normally closed when no light is being received by the electric eye and are opened by the flashing of a beam of light onto the electric eye of the electric eye means 23. The structure of the electric eye means 23 is conventional and forms no part of the present invention. The opposite side of the normally closed contacts of relay 108 is connected by a wire 109 to the main feed wire 105. Wiper 93 is also connected to wire 107 and thus to the normally closed contacts of relay 108.

One side of each of the snap-action switches 85(a), 85(b) and 85(c), which are normally open switches, is connected to wire 106. These switches are all in parallel with the opposite side, being connected by a wire 111 to one end of the coil 112 of a relay 113 and to one of the normally open contacts 114 of the relay. A wire 115 connects the other side of the normally open contact 114 to normally closed switch 25 and thence to the feed wire 106. The other side of relay coil 112 is connected by means of a wire 116 to power feed line 105. A second pair of normally open contacts 117 of relay 113 is connected to motor 19 and to power line 105. The other side of motor 19 is connected to power line 106.

As mentioned previously herein, the present invention was devised to solve the problem of hanging sides of leather 11 over carrying members 13 of a stacker 10. It was desired that one-third of the sides of leather be hung over the forward edge of the carrying member 13, with two-thirds of the side hanging over the trailing edge. The terms forward and trailing edge are used with respect to the line of movement of conveyor 12 as represented by arrow 120, although it bears the same relationship with respect to the line of movement of the carrying members 13 of stacker 10 as represented by arrow 121. It was determined that these sides of leather 11 would vary in size between two and six feet. Under these conditions the electric light 22 and the electric eye means 23 were positioned so that the beam 21 cut conveyor 12 at a point four feet rearwardly of the pick-up point of the side of leather 11. The pick-up point is the point immediately adjacent the end of conveyor 12 at which carrying member 13 receives the side of leather as the carrying member moves upwardly in the direction indicated by arrow 121.

The movement of cam 63 from the rest point, i. e. the position at which the pocket 67 in drive roll 65 is about upper drive wheels 50, to the position at which the switch 85 is actuated to start the movement of stacker 10 is 320° in the illustrated embodiment. Drive wheels 47 are connected to conveyor 12 at a speed ratio such that cam 63 will be turned 320° in the period of time required for a six foot hide 11 to pass (from the leading edge to the trailing edge) through light beam 21. Since it was desired to have two-thirds of the hide hanging rearwardly over the carrying members 13, drive wheel 50 is connected to turn cam 63 fifty percent faster than will drive wheel 47.

Assume that sequence switch 90 is positioned with contact arm 91 resting on contact 89(a) so that solenoid 83(a) is connected to relay 108 of the electric eye means 23. The light beam 21 being received by electric eye means 23 maintains relay 108 energized so that the contacts thereof are open. When light beam 21 is cut by a side of leather 11, relay 108 relaxes to energize solenoid 83(a). The armature 82(a) of solenoid 83(a) is pulled down to pivot rocker 55(a) downwardly and bring drive roll 64(a) into contact with drive wheel 47(a). This starts cam 63(a) rotating in a counterclockwise direction (Figure 3) from the rest point which was determined by the dished-out portion 67 of drive roll 65(a). As long as light beam 21 remains cut, drive wheel 47(a) continues to control the rotation of cam 63(a). If we assume that the hide that is moving along the conveyor at this time is six feet long, cam 63(a) will have turned 320° to actuate switch 85(a) at the instant the trailing edge of the hide passes the light beam 21 to allow the light beam to reactuate the electric eye means 23. Cam 63(a) at that instant closes switch 85(a) to energize coil 112 of relay 113, closing the contacts thereof. The lower contact is a holding contact to keep coil 112 energized. The upper contact 117 energizes motor 19 to start stacker 10. The carrying member 13 moves upwardly to pick up the hide with four feet of the hide (two-thirds of its length) being over the trailing edge of the carrying member and two feet of the hide being over the leading side of the carrying member.

At the same time that the hide just mentioned cut light beam 21 to energize solenoid 83(a), the solenoid 101 of the sequence switch 90 was also energized to rotate pawl 99 into one of steps 97. This has no effect on the position of the sequence switch. However, when solenoid 101 was deenergized by the re-establishing of the light beam, spring 102 will rotate pawl 99 in a counterclockwise direction to rotate the contact arm 91 in the same direction and move contact arm 91 from contact 89(a) to contact 89(b).

As carrying member 13 bearing the six foot hide moves upwardly it contacts the actuating arm 112 of switch 25 to open normally closed switch 25. This breaks the holding circuit through relay 113 to open the contacts thereof and denergize motor 19. Assume that the hide 11 following the six foot hide is a hide three feet in length. When the leading edge of the three-foot hide cuts light beam 21, relay 108 is again de-energized to close its contacts and create a new circuit through solenoid 83(b) and through solenoid 101 of the sequence switch. Solenoid 83(b) pulls rocker 55(b) down, bringing drive roll 64(b) and wheel 47(b) into contact. At the instant the leading edge of the three-foot hide is one foot from the pick-up point, the trailing edge of the hide passes the light beam 21, allowing the light beam to re-establish itself. This de-energizes solenoid 83(b) and solenoid 101 moving the sequence switch to contact 89(c). With solenoid 83(b) being de-energized, spring 72(b) moves rocker 55(b) in a clockwise direction to bring drive roll 65(b) into contact with drive wheel 50(b). Drive wheel 50(b) turns cam 63(b) fifty percent faster than the cam was when being turned by drive wheel 47(b). At the time that cam 63(b) actuates switch 85(b) to operate relay 113 and energize motor 19, one-third of the three foot hide, or one foot, will be over the leading edge of the carrying member 13 at the pick-up point, and two-thirds, or two feet, will be over the trailing edge. After actuating switch 85, cams 63 continue to rotate the full 360° at which time recess 67 in drive roll 65 fits about drive wheel 50 to stop the further movement of the cam. This is the reset, or starting position, for each rotation of the cam. In this position drive wheel 50 is maintained just out of contact with drive roll 65 by the adjustment of stop screw 68.

Another hide following after the three-foot hide will then actuate solenoid 83(c). Each solenoid is thus energized in turn as determined by the position of the sequence switch 90. Whichever of the solenoids is energized, the respective cam is commenced rotating and at the end of its 320° of rotation closes its respective switch before returning to its reset position as determined by cut-out 67. The closing of the respective switch actuates relays 113 and energizes motor 19. The motor 19 is stopped by the opening of normally closed switch 25 prior to the closing of the subsequent switch 85(a), 85(b), or 85(c) by the next hide moving along conveyor 12.

Since the hides being handled vary from six to two feet in length, it would be possible to have one hide draped over a carrying member 13 with the stacker 10 just being energized to commence picking up that hide followed by one and a part of a third hide between the trailing edge of the hide just being picked up and the line of the light beam 21. Since approximately three hides could be within this area at one time, I have three duplicate sections in the computer, each controlled by its own individual solenoid, with the stepping switch 90 operating to energize the solenoids 83 sequentially. If this condition did not exist, say for example that the articles moving along conveyor 12 were spaced sufficiently far apart so that only one could be within the critical area at any one time, two of the duplicate banks of computers and the sequence switch could be eliminated. In this case the solenoid 83 of the remaining computer would be connected directly to the contacts of relay 108 rather than being connected through the sequence switch as illustrated and described. The elimination of the two extra duplicate computer banks would also eliminate two of the three switches 85 so that relay 113 would only be controlled by the one remaining switch 85 in the remaining computer bank.

In order to illustrate how the invention may be employed with other articles or to solve other problems of a similar nature, it is first desirable that the principle of the operation of the disclosed device be clear. Cam 63 is a moving element that travels from a first, or rest, position, which position is determined by the cut-out 67 in drive roll 65 to a second position, which position is determined by the actuation of arm 86 of switch 85, in a manner such that the switch will be actuated at the time that the desired part of the article, e. g. the hide, is over a predetermined location, e. g. the pick-up point of carrying members 13, with respect to conveyor 12 with a given percentage of the length of the article rearward of that location. Since the cam 63 travels in one direction between the first and second positions, the rate of motion of the cam during any portion of its travel may be expressed as a velocity. Drive wheel 47 first moves the cam at a velocity that is related to the speed of the object along the conveyor. The second drive wheel 50, when brought into play, drives the cam at another velocity. These two velocities are so related that after the leading edge of the object passes a given point along the conveyor, e. g., the line of beam 21, the cam 63 will be moved between its first and second position at a rate such that the desired part of the object will be over the given location at the time the switch 85 is actuated with a given percentage of the object rearward of that location.

Figure 5:
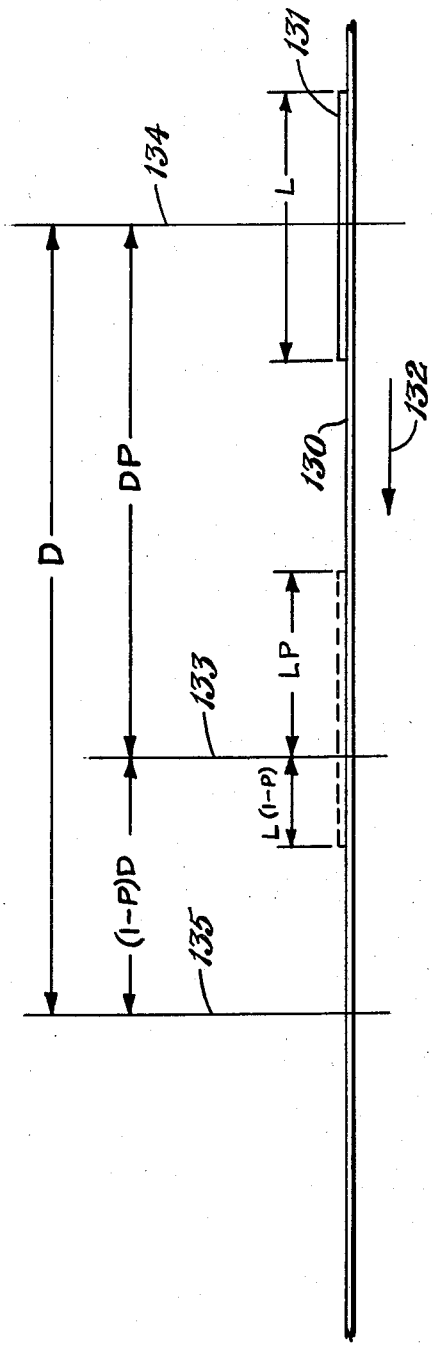
Figure 5 is a diagram used in describing the principle of operation of the invention and its application for other uses.

To determine just how the two velocities may be obtained in any given application, reference might be made to Figure 5 wherein horizontal line 130 represents a conveyor moving objects 131 having a length L in a direction indicated by arrow 132. Vertical line 133 represents a location along conveyor 130. It is at this location that one seeks to know when a particular portion of the object 131 is over the location with a given percentage, P, of the length of the object rearwardly of the location. A point along conveyor 130 rearwardly of location 133 is chosen and is represented in Figure 5 by vertical line 134. The point 134 may be chosen with respect to the length of the articles 131 as was done in Figure 1, or it may be chosen with respect to the position of some other equipment, or for any other reason. The dimension D represents the length of the longest article that may be handled (and is the distance from the given point to line 135) and is dependent upon the distance between the given point and the pre-determined location (line 133), that distance being equal to the given percentage of the length of the longest article otherwise expressed as DP. In some instances herein the dimension DP is represented as "d."

The velocity, V, of cam 63 when driven by the drive wheel 47 should be such that the cam will move from its starting point to the point of actuation of switch 85 (320° in the disclosed embodiment) in the time, T, that it would take an object of the length of D to move past point 134. The formula for this velocity, therefore, is $$V = k\frac{D}{T}$$

in terms of the movement of conveyor 130 where $k$ is a factor representing the ratio of the distance cam 63 travels between the first and second positions, to the dimension D. Another way of stating this would be that an object of the length of D would start cam 63 rotating when its leading edge passed point 134 and would actuate switch 85 when its trailing edge reached point 134. When its trailing edge was at point 134 the leading edge of that object would be at the point represented by line 135. As will be hereinafter apparent it is more convenient to discuss the movement of the cam in relation to the movement of objects along the conveyor since 320° of rotation of the cam (or such other amount of angular rotation as is chosen for the distance between the starting point and the point of actuation of the switch) may be directly correlated to this dimension very readily. Thus D not only represents the length of the largest object handled but may also represent the degrees of rotation of the cam during the effective portion of its operating cycle.

The velocity of the cam 63 when driven by the upper drive wheels 50 can be derived as follows with respect to Figure 5:

As mentioned in the preceding paragraph, the total cam travel, starting at the time when the object 131 breaks light beam 134 by the leading edge of the object passing through the light beam until the switch 85 is actuated = D.

Similarly, the cam travel from the time that the light beam is broken at line 134 by object L moving thereacross to the time that the light beam is re-established by the rear edge of the object moving past point 134 = L.

Therefore, the amount of cam travel from the time that the light is re-established to the time of actuation of switch 85 (It is, of course, desired to actuate switch 85 at the time that object L is positioned across line 133, the pick-up point, with LP of the length of the object 131 rearwardly of line 133.) = D − L.

The total travel of the leading edge of the object from the time that the light beam is broken by the object 131 until the object is properly positioned at the pick-up point 133 = DP + L(1 − P).

The total travel of the leading edge of the object from the time of light break until the light is re-established at point 134 = L.

Therefore, the total travel of the leading edge of the object from the time of light re-establishment to proper positioning at pick-up point 133 = DP + L(1 − P) − L.

The time for the object to travel from the time the light is re-established to the time of proper positioning at the pick-up point 133 equals the time for the cam to travel from the time the light is re-established to actuation of switch 85 = t.

Using the formula: $\text{Velocity} = \dfrac{\text{Distance}}{\text{Time}}$ $$\frac{\text{Velocity of the cam (from light re-establish to pick-up point)}}{\text{Velocity of the object 131 (light re-established to pick-up)}} =$$

$$\frac{\dfrac{D-L}{t}}{\dfrac{DP+L(1-P)-L}{t}} = \frac{D-L}{DP+L-PL-L} = \frac{D-L}{P(D-L)}$$

$$= \frac{1}{P}.$$

It was pointed out in the preceding paragraph that the velocity of the cam when driven by lower wheel 47 is related to the velocity of the object on the conveyor. Therefore, the formula for determining the velocity, V′, of the cam from the time when the light is re-established, i. e. when the trailing edge of object 131 passes point 134, to the time when the object is properly positioned at the given location represented by line 133, e. g. the pick-up point, is determined from the following formula:

$$V' = \frac{1}{P}V$$

wherein V equals the velocity of the cam from the time the light is broken to the time that the light is re-established, and P equals the percentage of the object which is to be rearwardly of point 133 when the object is properly positioned at that point. The upper drive wheel 50 will turn the cam $$\frac{1}{P}$$

times the speed at which the cam is turned by lower drive wheel 47.

From the foregoing description, it will be apparent that the device I have devised carries out the method of my invention as hereinbefore described. A time standard is established, which standard is the length of time that it would take an object of D length to be properly positioned over the pick-up point 133 after the leading edge of the object traversed the given point, line 134, and corresponds to the cam travel when driven at a speed related to the speed of movement of the object on the conveyor. From that standard I subtract the length of time required by object 131 to traverse point 134 to obtain a time difference for that object. By multiplying that time difference times the percentage of the article which I wish to have rearwardly of point 133 at the time that the article is properly positioned with respect to point 133, I obtain the length of time it will take for the object to be so properly positioned after it leaves point 134.

This may be demonstrated as follows:

The distance along the conveyor that the object 131 must travel after leaving point 134
$$= DP + L(1-P) - L$$
$$= DP + L - LP - L$$
$$= P(D-L).$$

Obviously T (the time for an object of D length to move its leading edge from line 134 to line 135 when moving at the fixed velocity of the conveyor) varies with the dimension D, and in the same manner $t_1$ (the time for object 131 to move its leading edge from point 134 to a point such that its trailing edge is at point 134 moving, of course, at the same velocity) varies with the dimension L. Thence $t$, the time that it takes object 131 to move its trailing edge from line 134 to the desired position over location 133, is obtained by substitution of these into the foregoing formula, so that $t = P(T - t_1)$. The length of travel of the cam 63 from the starting point as determined by cut-out 67 to the actuation of switch 85 represents the standard, T. From this is subtracted the time, $t_1$, required for the object to move across the light beam 134, by a portion of the cam travel being used up during this movement of the object 131. The remaining portion of the travel of the cam is done in a time which is P times the difference so that the machine thereby performs the computation of the method.

The foregoing detailed description is only for clearness of understanding and for the purpose of complying with 35 U. S. C. 112, and I do not desire to be limited to the exact details of construction shown and described for obvious modifications will occur to a person skilled in the art.

I claim:

1. A device for removing sheets of material from a conveyor, said device comprising a frame, endless means mounted on said frame, said means being positioned on said frame to have a generally vertical run positioned at the discharge end of said conveyor, a carrying member supported on said endless means for movement thereby along said run, power means connected to said endless means to move said member upwardly along said run, and control means operatively connected to said power means to stop the movement of said endless means when said member is immediately adjacent the end of said conveyor in a position that a sheet from said conveyor will pass over said member, said control means including computing means to measure the length of each sheet moving along said conveyor, said control means being operatively connected to said power means to start the movement of said endless means when a portion of a sheet representing a predetermined proportion of the total length of said sheet has passed over said member.

2. A device for removing sheets of material from a conveyor, said device comprising a frame, endless means mounted on said frame, said means being positioned on said frame to have a generally vertical run positioned at the discharge end of said conveyor, a carrying member supported on said endless means for movement thereby along said run, power means connected to said endless means to move said member upwardly along said run, and control means operatively connected to said power means to stop the movement of said endless means when said member is immediately adjacent the end of said conveyor in a position that a sheet from said conveyor will pass over said member, said control means including a member movable between a first and a second point, said control means being effective to start the movement of said endless means when said movable member reaches said second point, and means connecting said movable member to said conveyor for commencing the movement of said movable member from said first point at the time the leading edge of a sheet on said conveyor passes a given point along said conveyor, to move said movable member at a rate of speed related to the speed of movement of the sheet until the time the trailing edge of said sheet passes said given point, and to move said movable member at a second rate of speed from said last mentioned time, said rates of speed being such that a segment of the sheet representing a predetermined percentage of the total length of said sheet will have passed over said carrying member when said control means starts the movement of the endless means.

3. A device for removing sheets of material from a conveyor, said device comprising a frame, endless means mounted on said frame, said means being positioned on said frame to have a generally vertical run positioned at the discharge end of said conveyor, a carrying member supported on said endless means for movement thereby along said run, power means connected to said endless means to move said member upwardly along said run, and control means operatively connected to said power means to stop the movement of said endless means when said member is immediately adjacent the end of said conveyor in a position that a sheet from said conveyor will pass over said member, said control means including a member movable between a first and a second point, said control means being effective to start the movement of said endless means when said movable member reaches said second point, and means connecting said movable member to said conveyor for commencing the movement of said movable member from said first point at the time the leading edge of a sheet on said conveyor passes a given point along said conveyor, to move said movable member at a first velocity until the time the trailing edge of said sheet passes said given point, and to move said movable member at a second velocity from said last mentioned time, said first velocity (V) being determined by the formula $$V = k\frac{d}{PT}$$

wherein $d$ equals the distance from the given point to the end of said conveyor, P equals the ratio of length of the portion of the sheet desired to remain on the conveyor side of said carrying member to the total length of the sheet, T equals the time for a sheet of $$\frac{d}{P}$$

length to move past said given point and $k$ is a factor dependent upon the distance through which the movable member travels from said first to said second point, said second velocity (V') being determined from the formula $$V' = \frac{V}{P}$$

wherein V equals the first velocity, and P equals the ratio of length of the portion of the sheet desired to remain on the conveyor side of said carrying member to the total length of the sheet.

4. A device for removing sheets of material from a conveyor, said device comprising a frame, endless means mounted on said frame, said means being positioned on said frame to have a generally vertical run positioned at the discharge end of said conveyor, a carrying member supported on said endless means for movement thereby along said run, power means connected to said endless means to move said member upwardly along said run, and control means operatively connected to said power means to stop the movement of said endless means when said member is immediately adjacent the end of said conveyor in a position that a sheet from said conveyor will pass over said member, said control means including a cam mounted for rotation along a given path from a first position, actuating means positioned at a second position along said path to start the movement of said endless means when contacted by said cam, a first driving means for said cam, a second driving means for said cam, means to engage said cam with said first driving means when the leading edge of said sheet on said conveyor passes a given point along said conveyor and to disengage said cam from said first driving means and to engage said cam with said second driving means when the trailing edge of said sheet passes said given point, said first driving means being effective when engaged with said cam to rotate said cam toward said second position at a first velocity related to the speed of movement of said sheet along said conveyor, said second driving means being effective when engaged with said cam to rotate said cam in the same direction at another velocity, said velocities being such that a segment of the sheet representing a predetermined percentage of the total length of said sheet will have passed over said carrying member when said control means starts the movement of the endless means, and means to stop said cam upon said cam returning to said first position.

5. A device for removing sheets of material from a conveyor, said device comprising a frame, endless means mounted on said frame, said means being positioned on said frame to have a generally vertical run positioned at the discharge end of said conveyor, a carrying member supported on said endless means for movement thereby along said run, power means connected to said endless means to move said member upwardly along said run, and control means operatively connected to said power means to stop the movement of said endless means when said member is immediately adjacent the end of said conveyor in a position that a sheet from said conveyor will pass over said member, said control means including a cam mounted for rotation along a given path from a first position, actuating means positioned at a second position along said path to start the movement of said endless means when contacted by said cam, a first driving means for said cam, a second driving means for said cam, means to engage said cam with said first driving means when the leading edge of said sheet on said conveyor passes a given point along said conveyor and to disengage said cam from said first driving means and to engage said cam with said second driving means when the trailing edge of said sheet passes said given point, said first driving means being effective when engaged with said cam to rotate said cam toward said second position at a first velocity proportional to the speed of movement of said sheet along said conveyor, said second driving means being effective when engaged with said cam to rotate said cam in the same direction at another velocity, said first velocity (V) being determined by the formula $$V = k\frac{d}{PT}$$

wherein $d$ equals the distance from the given point to the end of said conveyor, P equals the ratio of length of the segment of the sheet desired to remain on the conveyor side of said carrying member to the total length of the sheet, T equals the time for a sheet of $$\frac{d}{P}$$

length to move past said given point and $k$ is a factor dependent upon the distance through which the movable member travels from said first to said second point, said second velocity (V') being determined from the formula $$V' = \frac{V}{P}$$

wherein V equals the first velocity and P equals the ratio of length of the segment of the sheet desired to remain on the conveyor side of said carrying member to the total length of the sheet, and means to stop said cam upon said cam returning to said first position.

6. A control device for determining when a predetermined percentage of the length each of a series of articles of varying sizes traveling along a conveyor at a given rate of speed will have passed a predetermined location along said conveyor, said device comprising a member movable between a first and a second point, and means connecting said movable member to said conveyor for commencing the movement of said member from said first point at the time the leading edge of an article on said conveyor passes a given point along said conveyor ahead of said location, to move said member at a velocity related to the rate of speed of movement of the article until the trailing edge of said sheet passes said given point and thereafter to move said movable member at a second velocity, said velocities being such that said percentage of said length will be beyond said location when said member reaches said second point.

7. A control device for determining when a portion of the length of each of a series of articles of varying sizes traveling along a conveyor at a given rate of speed will have passed a predetermined location along said conveyor with a predetermined percentage of the length of an article being rearwardly of said location, said device comprising a member movable between a first and a second point, and means connecting said movable member to said conveyor for moving said member from said first point at a first velocity from the time the leading edge of an article on said conveyor passes a given point along said conveyor ahead of said location, and moving said movable member at a second velocity from the time the trailing edge of said article passes said given point, said first velocity (V) being determined by the formula $$V = k\frac{d}{PT}$$

wherein $d$ equals the distance from the given point to said location, P equals the percentage of the length of the article to be rearwardly of said location, and T equals the time for an article of $$\frac{d}{P}$$

length to move past said given point and $k$ is a factor dependent upon the distance through which the movable member travels from said first to said second point, said second velocity (V') being determined from the formula $$V' = \frac{V}{P}$$

wherein V equals the first velocity, and P equals the percentage of the length of the article to be rearwardly of said location.

8. A control device for determining when a portion of the length of each of a series of articles of varying sizes traveling along a conveyor at a given rate of speed will have passed a predetermined location along said conveyor with a predetermined percentage of the length of an article being rearwardly of said location, said device comprising a cam mounted for rotation along a given path from a first position, actuating means positioned at a second position along said path, a first driving means for said cam, a second driving means for said cam, means to engage said cam with said first driving means when the leading edge of an article on said conveyor passes a given point along said conveyor and to disengage said cam from said first driving means and to engage said cam with said second driving means when the trailing edge of said article passes said given point, said first driving means being effective when engaged with said cam to rotate said cam toward said second position at a first velocity related to the speed of movement of said sheet along said conveyor, said second driving means being effective when engaged with said cam to rotate said cam in the same direction at another velocity, said velocities being such that a given percentage of the length of said article will be rearwardly of said location when said cam reaches said second position, and means to stop said cam upon said cam returning to said first position.

9. A control device for determining when a portion of the length of each of a series of articles of varying sizes traveling along a conveyor at a given rate of speed will have passed a predetermined location along said conveyor with a predetermined percentage of the length of an article being rearwardly of said location, said device comprising a cam mounted for rotation along a given path from a first position, actuating means positioned at a second position along said path, a first driving means for said cam, a second driving means for said cam, means to engage said cam with said first driving means when the leading edge of an article on said conveyor passes a given point along said conveyor and to disengage said cam from said first driving means and to engage said cam with said second driving means when the trailing edge of said article passes said given point, said first driving means being effective when engaged with said cam to rotate said cam toward said second position at a first velocity, said second driving means being effective when engaged with said cam to rotate said cam in the same direction at a second velocity, said first velocity (V) being determined by the formula $$V = k\frac{d}{PT}$$

wherein $d$ equals the distance from the given point to the end of said conveyor, P equals the percentage of said article to be rearwardly of said location, T equals the time for an article of $$\frac{d}{P}$$

length to move past said given point and $k$ is a factor dependent upon the distance through which the movable member travels from said first to said second point, said second velocity (V') being determined from the formula $$V' = \frac{V}{P}$$

wherein V equals the first velocity and P equals the percentage of said article to be rearwardly of said location, and means to stop said cam upon said cam returning to said first position.

10. A control device for determining when a portion of the length of each of a series of articles of varying sizes traveling along a conveyor at a given rate of speed will have passed a predetermined location along said conveyor with a predetermined percentage of the length of an article being rearwardly of said location, said device comprising a frame, a cam rotatably mounted on said frame, a first and a second driving member attached to said cam and rotatable therewith, a first driving means mounted on said frame and positioned at one side of said cam in alignment with said first driving member, a second driving means mounted on said frame and positioned at the opposite side of said cam in alignment with said second driving member, control means positioned in the path of said cam to be actuated thereby during a rotation of said cam, means to engage said second driving means and said second driving member only during the period an article is traversing a given point ahead of said location and to engage said first driving means and said first driving member only during the period after said article passes said point, both of said driving means being connected to said conveyor to rotate at speeds such that said percentage of said length will be rearwardly of said location when said control means is actuated by said cam.

11. A control device for determining when a portion of the length of each of a series of articles of varying sizes traveling along a conveyor at a given rate of speed will have passed a predetermined location along said conveyor with a predetermined percentage of the length of an article being rearwardly of said location, said device comprising a frame, an arm pivotally connected to said frame, a cam rotatably attached to said arm at a point remote from said pivotal connection, a first and a second circular driving member attached to said cam and rotatable therewith, a first circular driving means rotatably mounted on said frame and positioned at one side of said arm in alignment with said first driving member, a second circular driving means rotatably mounted on said frame and positioned at the opposite side of said lever in alignment with said second driving member, said first driving member having a portion of the periphery thereof of concave shape to fit about a portion of the periphery of said first driving means, resilient means urging said arm in a direction to move said first driving member towards said first driving means, power means to move said arm to bring said second driving member into engagement with said second driving means, control means positioned in the path of said cam to be actuated thereby during a rotation of said cam, and means to actuate said power means during the period an article is traversing a given point ahead of said location, said driving means being connected to said conveyor to rotate at speeds such that said percentage of said length will be rearwardly of said location when said control means is actuated by said cam.

12. A control device for determining when a portion of the length of each of a series of articles of varying sizes traveling along a conveyor at a given rate of speed will have passed a predetermined location along said conveyor with a predetermined percentage of the length of an article being rearwardly of said location, said device comprising a frame, a cam rotatably mounted on said frame, a first and a second driving member attached to said cam and rotatable therewith, a first driving means mounted on said frame and positioned at one side of said cam is alignment with said first driving member, a second driving means mounted on said frame and positioned at the opposite side of said cam in alignment with said second driving member, control means positioned in the path of said cam to be actuated thereby during a rotation of said cam, means to engage said second driving means and said second driving member only during the period an article is traversing a given point ahead of said location and to engage said first driving means and said first driving member only during the period after said article passes said point, said second driving means being connected to said conveyor to rotate said cam at a velocity (V) determined by the formula $$V = k\frac{d}{PT}$$

wherein $d$ equals the distance from the given point to said location, P equals the percentage of the length of the article to be rearwardly of said location, T equals the time for an article of $$\frac{d}{P}$$

length to move past said given point and $k$ is a factor dependent upon the distance through which the movable member travels from said first to said second point, said first driving means being connected to said conveyor to rotate said cam at a velocity (V') determined from the formula $$V' = \frac{V}{P}$$

wherein V equals the velocity of the cam driven by the second driving means and P equals the percentage of the length of the article to be rearwardly of said location.

13. A control device for determining when a portion of the length of each of a series of articles of varying sizes traveling along a conveyor at a given rate of speed will have passed a predetermined location along said conveyor with a predetermined percentage of the length of an article being rearwardly of said location, said device comprising a cam mounted for rotation along a given path from a first position, actuating means positioned at a second position along said path, a first driving means for said cam, a second driving means for said cam, means to engage said cam with said first driving means when the leading edge of an article on said conveyor passes a given point along said conveyor and to disengage said cam from said first driving means and to engage said cam with said second driving means when the trailing edge of said article passes said given point, said first driving means being effective when engaged with said cam to rotate said cam toward said second position at a velocity such that the cam will move from the first position to the second position in the time required for an article of a length equal to the distance between said predetermined location and said given point divided by said predetermined percentage would take to move past said given point, said second driving means being effective when engaged with said cam to rotate said cam in the same direction at a velocity equal to the velocity of the cam when driven by the first driving means divided by said predetermined percentage.

14. Control apparatus comprising a frame, a cam rotatably mounted on said frame, a first and a second driving members attached to said cam and rotatable therewith, a first driving means mounted on said frame and positioned at one side of said cam in alignment with said first driving member, a second driving means mounted on said frame and positioned at the opposite side of said cam in alignment with said second driving member, control means positioned in the path of said cam to be actuated thereby during a rotation of said cam, means to selectively engage said first driving means with said first driving member or said second driving means with said second driving member.

15. Control apparatus comprising a frame, an arm pivotally connected to said frame, a cam rotatably attached to said arm at a point remote from said pivotal connection, a first and a second circular driving members attached to said cam and rotatable therewith, a first circular driving means rotatably mounted on said frame and positioned at one side of said arm in alignment with said first driving member, a second circular driving means rotatably mounted on said frame and positioned at the opposite side of said lever in alignment with said second driving member, said first driving member having a portion of the periphery thereof of concave shape to fit about a portion of the periphery of said first driving means, resilient means urging said cam in a direction to move said first driving member towards said first driving means, power means to move said arm to bring said second driving member into engagement with said second driving means, and control means positioned in the path of said cam to be actuated thereby during a rotation of said cam.

References Cited in the file of this patent
UNITED STATES PATENTS 2,171,362     Gulliksen     Aug. 29, 1939
2,724,482     Francisci     Nov. 22, 1955